Aug. 25, 1959 C. E. HEMMINGER ET AL 2,901,415
HYDROFORMING WITH PRELIMINARY HYDRODESULFURIZATION
Filed May 27, 1955
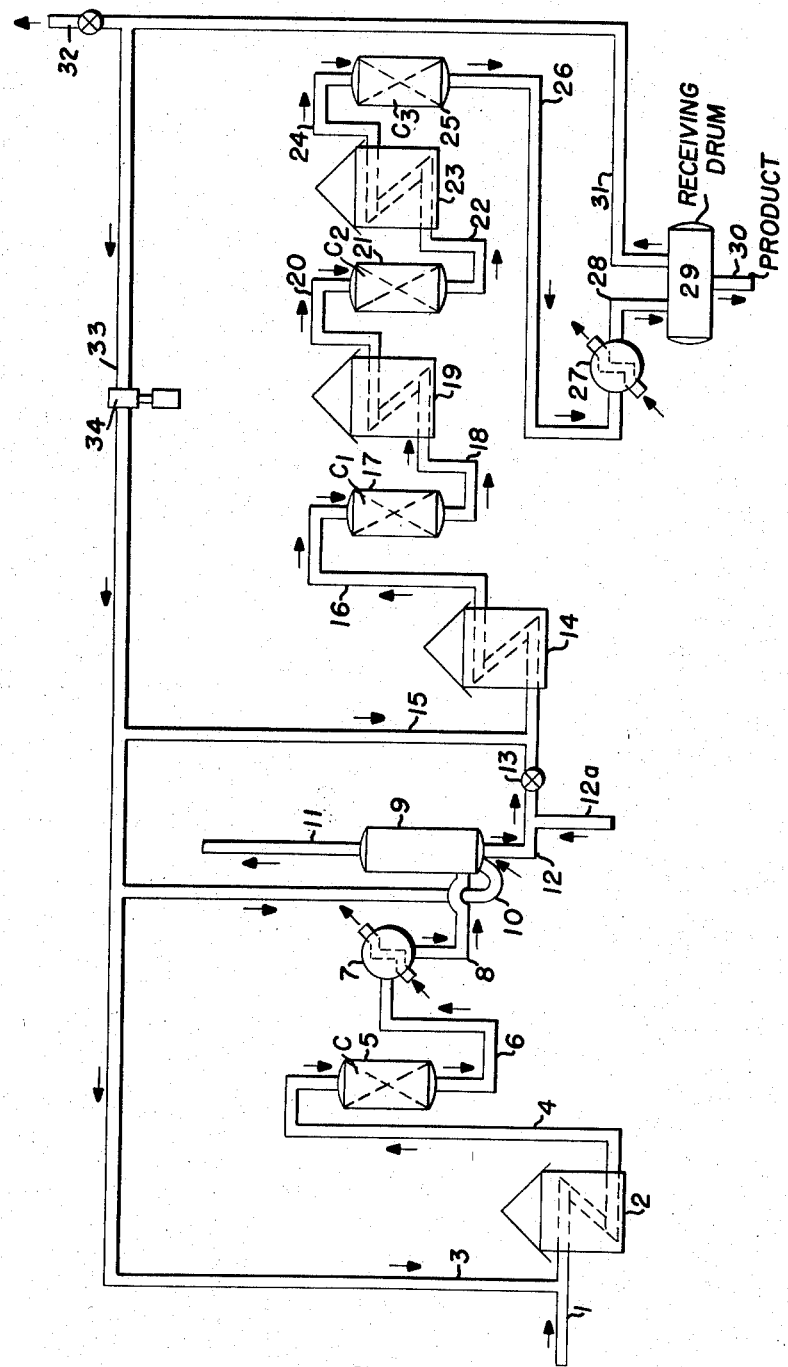
Charles E. Hemminger
Albert B. Welty, Jr.
Wilfred O. Taff
Richard W. Sage
By
Inventors
J. Cashman
Attorney United States Patent Office 2,901,415
Patented Aug. 25, 1959

2,901,415

HYDROFORMING WITH PRELIMINARY HYDRODESULFURIZATION

Charles E. Hemminger, Albert B. Welty, Jr., and Wilfred O. Taff, Westfield, and Richard W. Sage, Fanwood, N.J., assignors to Esso Research and Engineering Company, a corporation of Delaware Application May 27, 1955, Serial No. 511,682

7 Claims. (Cl. 208—65)

The present invention relates to improvements in hydroforming. More particularly, it relates to improvements in hydroforming using a platinum group metal catalyst in which a combination of critical conditions are coordinated to give improved results, particularly, with respect to the maintenance of the catalyst at a high level of activity and selectivity for long periods of time.

Hydroforming is an operation conducted at elevated temperatures and pressures in the presence of a solid catalytic material and added hydrogen wherein a naphtha is treated under conditions indicated to produce a product of improved octane rating. The naphtha feed may be a virgin naphtha, a cracked naphtha, a coker naphtha, a Fischer synthesis naphtha, or a mixture of these naphthas. The process is ordinarily conducted so that there is a net production of hydrogen. The catalysts employed are metals of the platinum group, specifically, platinum itself, or the oxides of the V and VI groups of the periodic system, such as molybdenum oxide or chromium oxide. The hydrogenation-dehydrogenation component of the catalyst, that is to say, the platinum, molybdena, etc. is usually supported on an adsorbent material, such as active alumina.

Hydroforming operations conducted on a commercial scale may be divided into two classes as follows:

(1) The non-regenerative type of operation in which the catalyst is continuously employed in the hydroforming process for an extended period of time up to six months or more without regeneration or replacement.

(2) The regenerative type of operation where the catalyst is either continuously or periodically treated with the regeneration gas to remove carbonaceous and other deposits formed on the catalyst during the hydroforming, which deposits deactivate the catalyst.

The present invention relates to the non-regenerative type of operation where a catalyst containing, say, 0.6 wt. percent of platinum based on the total weight of catalyst is supported on eta alumina. Under the critical conditions herein set forth, it has been found that using a platinum catalyst, a naphtha may be hydroformed to 92-95 Research clear octane number for a period of 6-12 months without requiring catalyst replacement or regeneration. The very low catalyst deactivation rate during this extended period of continuous on-stream operation is accompanied by a gradually increasing preheat temperature of the feed to the various reactors. During this period the average selectivity of the catalyst is essentially that of the fresh catalyst.

The object of this invention is to provide the proper concentrations of sulfur, halogen and water to obtain the unusually good catalyst life characteristics described above.

Other and further objects of the invention will appear in the following more detailed description and claims.

In the accompanying drawing there is depicted, diagrammatically, the essential elements of a plant in which a preferred modification of the present invention may be carried into effect.

Referring to the drawing, it is first pointed out that in general the plant therein represented consists of hydrodesulfurization facilities and hydroforming facilities in order that a stock which contains sulfur may be efficiently treated.

Referring in more detail to the drawing, a naphtha feed containing, say, about 0.15 wt. percent sulfur enters the present system through line 1 and is charged to a furnace or other heating means 2 wherein it is heated to a temperature of 550°–700° F. A hydrogen-containing gas in line 3 is also charged to the furnace 2 and reheated with the oil. The heated mixture of oil and hydrogen is withdrawn from furnace 2, through line 4 and charged to a hydrodesulfurization vessel 5 wherein it is caused to flow downwardly in contact with a known hydrodesulfurizing catalyst, preferably, cobalt molybdate.

Under conditions which are set forth more fully hereinafter, the desired treatment occurs and the material is withdrawn from the bottom of treater 5, through line 6 and charged to a cooler 7 wherein it is cooled sufficiently to condense normally liquid constituents. The cooled material is withdrawn from 7 and charged to a stripping tower 9. In stripping tower 9, it is treated with a gasiform material such as hydrogen, nitrogen or any inert gas, which stripping gas is charged to the tower 9 through line 10, the stripping gas passing upwardly through the liquid and serving to remove excess volatile sulfur material, such as $H_2S$. The stripping gas and the removed sulfur-containing material are rejected from the system through line 11.

As will hereinafter be more fully explained, one of the important features of the present improvements has reference to adjusting within critical limits the sulfur, halogen and water content of the liquid material drawn from the bottom of tower 9 to be hydroformed. The feed naphtha usually contains halogen, also 0.01 to 0.03 weight percent of water. These materials are removed during the hydrofining step and stripping following the hydrofining step. The sulfur content should be reduced to about 0.001 weight percent. However, during the hydrofining or hydrodesulfurization step, it may not always be possible to remove the desired amount of sulfur because of, say, an upset caused by a temperature change. The water and halogen content of the oil are also reduced during the hydrodesulfurization, as stated. Therefore, it may be necessary to add these materials to the oil withdrawn from tower 9 to supply the proper amount of these materials prior to the hydroforming operation.

The naphtha is withdrawn from tower 9, through line 12, carrying valve 13 and charged to furnace 14. Hydrogen-containing gas in line 15 is also charged to furnace 14 and this mixture is heated to a hydroforming temperature, thence withdrawn through line 16 and charged to a reactor 17 containing a bed $C_1$ of hydroforming catalyst, preferably, platinum carried on eta alumina. Under conditions more fully set forth hereinafter, the desired hydroforming reaction occurs and the product is withdrawn from reactor 17, through line 18, reheated in a second furnace 19, thence passed via line 20 to a second reactor 21 containing a bed of catalyst of the same composition as that in reactor 17. The desired reaction occurs in reactor 21, the product is withdrawn through line 22 and charged to a furnace 23 wherein the oil is reheated and charged via line 24 to a third reactor 25 containing a bed of catalyst $C_3$. The crude product is withdrawn from reactor 25, through line 26, passed to a cooler 27 and thence passed via line 28 into a separator 29. The crude product in 29 is at a temperature of about 100° F. and, therefore, normally liquid constituents are in the form of a hydroformed condensate. This condensate may be withdrawn from separator 29, through line 30 and delivered to distillation and other finishing equipment (not shown) to obtain the desired product. The gasiform material which contains 70 to 90% hydrogen is withdrawn overhead from separator 29, through line 31, and a portion of this material may be rejected from the system through line 32. The remainder of the material is passed via line 33, through a compressor 34 for recycling to lines 3 and 15 as previously explained.

In order to give further information regarding the present improvements, the following information is set forth:

EXAMPLE

In the event that the naphtha contains appreciable quantities of sulfur, it is first hydrodesulfurized to reduce the sulfur content to about 0.0005–0.0015 wt. percent on feed.

*Conditions in hydrodesulfurization zone 5*

| | |
|---|---|
| Catalyst | (Cobalt molybdate) 12 wt. percent on alumina 88 wt. percent. |
| Temperature, °F. | 550–700. |
| Pressure, p.s.i.g. | 400. |
| Oil feed rate, lbs. per hour per lb. of catalyst in reactor | 2. |
| Hydrogen feed rate per barrel of oil feed | 500–1000 s.c.f. |
| Once through operation. | |

As previously pointed out, the hydrodesulfurized naphtha feed is adjusted with respect to its sulfur, halogen and water content and these critical conditions appear in the tables below, together with an inspection of the feed and the product.

*Inspection of feed to hydroformer*

| | |
|---|---|
| Boiling range, °F. | 250–315 |
| Naphthenes, vol. percent | 47 |
| Paraffins, vol. percent | 41 |
| Aromatics, vol. percent | 12 |
| Amount of sulfur in feed, wt. percent | 0.001 |
| Amount of chlorine in feed oil in parts per million per parts of oil | 2 |
| Amount of water in feed oil in parts per million per parts of oil | 7 |

*Conditions in hydroforming zone*

| | |
|---|---|
| Catalyst composition | Eta alumina 100% Pt 0.6, Cl 0.65 wt. percent. |
| Temperature,[1] °F. (inlet to each reactor) | 900–910. |
| Pressure, p.s.i.g. | 400. |
| Oil feed rate, w./hr./w. | 1.3. |
| Standard cubic feet of hydrogen-containing gas fed to reaction per barrel of oil feed | 6000. |
| Concentration of hydrogen in hydrogen-containing gas, mol percent | 70–90. |

[1] There is a temperature drop of about 130° F. in the first reactor with smaller temperature drops in succeeding reactors.

*Inspection of product*

| | | |
|---|---|---|
| Vol. percent of $C_5+$ hydrocarbons based on feed | 88 | 86.5 |
| Vol. percent aromatics | 55 | 59 |
| Research Octane Number Clear | 92 | 95 |

A naphtha was hydroformed under the above conditions and it was found that after 1000 hours, the catalyst had actually increased slightly its selectivity to $C_5+$ gasoline and retained a major portion of its activity.

To recapitulate briefly, the present invention relates to improvements in the hydroforming of naphthas in fixed bed operation using a platinum group metal catalyst, such as platinum itself. It has been found that by observing critical conditions of temperature, pressure, amount of hydrogen charged to the reaction zone per barrel of oil, the amount of sulfur in the feed, the amount of water fed to the reaction zone and the proper proportioning of the amount of water fed to the reaction zone with respect to the chlorine entering the reaction zone, that greatly improved results are obtained in that the catalyst is maintained at a high level of activity and selectivity for an extended period of time. In this connection the deactivation rate of the catalyst in the present operation was compared with a standard catalyst and it was found that the standard catalyst deactivated at a rate which was 25% greater than that of the present catalyst. It is also pointed out in connection with the present improvements that as time goes on the inlet temperature of the oil feed to the reaction zones may be gradually increased from, say, around 900° to about 965° F. to compensate for lowering of the catalyst activity as evidenced by a lowering of the octane number of the product.

As hereinbefore explained, the present invention relates to a method of first hydrodesulfurizing or hydrofining a sulfur-containing naphtha feed and thereafter hydroforming the feed. It is important to adjust the sulfur content of the feed to the hydroformer and also to adjust the water and halogen content of the said feed to the hydroformer. Good results are obtained by actually adding sulfur in the event that the sulfur content is below 0.001. Also as previously pointed out, it may be necessary to add water so that the feed to the hydroformer contains 5–20 parts of water per million parts of oil. And with respect to the halogen content of the feed to the hydroformer, this should be in an amount of from 1–10 parts per million expressed as chlorine. Without wishing to be bound by any theory, it appears that in order to activate the chlorine or other halogen, a small amount of water in the feed is necessary.

What is claimed is:

1. In the hydroforming of sulfur-containing naphthas carried out in the presence of a platinum group metal catalyst, the improvement comprising subjecting the naphtha to hydrodesulfurization to reduce the sulfur content of the said naphtha, thereafter subjecting the thus treated naphtha to stripping with an inert gas to remove volatile sulfur material, thereafter adjusting to sulfur content of the thus treated naphtha to about 0.001 wt. percent, adjusting the halogen content of the thus treated naphtha to about 1 to 10 parts per million parts of naphtha and adjusting the water content of the said naphtha to from 5 to 20 parts per million parts of naphtha thereby providing a feed stock for hydroforming which may be treated under hydroforming conditions in the presence of a platinum group metal catalyst for an extended period of time without causing serious deactivation of the catalyst, subjecting the thus adjusted feed stock to hydroforming in a plurality of separate hydroforming zones each containing a fixed bed of a platinum group metal catalyst carried on a support comprising eta alumina, said zones being employed in series and recovering a product of improved octane rating from the hydroforming step.

2. The method set forth in claim 1 in which the hydrodesulfurization of the naphtha is carried out in the presence of a cobalt molybdate catalyst.

3. The method set forth in claim 1 in which the inlet temperature of the desulfurized naphtha fed to the several zones is gradually increased, with the passage of time, up to a maximum of about 965° F.

4. The method set forth in claim 1 in which the halogen is chloride.

5. The method of hydroforming a naphtha containing sulfur which comprises first subjecting the naphtha to hydrodesulfurization in the presence of a cobalt molybdate catalyst and added hydrogen in the hydrogen in the hydrodesulfurization zone, withdrawing the thus treated material from said zone, subjecting the said material to stripping in the presence of an inert gasiform material to remove a sulfur-containing material, adjusting the sulfur content of the thus treated naphtha to about 0.001 wt. percent, adjusting the halogen content of the said naphtha to about 2 parts per million and adjusting the water content of the said naphtha to about 7 parts per million parts per naphtha, subjecting the thus adjusted naphtha to hydroforming in the presence of a catalyst comprising platinum carried on eta alumina in a plurality of separate reaction zones operating in series, maintaining the inlet temperature of the naphtha feed to the several zones within the range of from about 900°–965° F. and recovering from the hydroforming operation a naphtha of improved octane rating.

6. The method set forth in claim 5 in which sulfur is added to the hydrodesulfurized naphtha to increase the sulfur content to about 0.001 wt. percent.

7. The method set forth in claim 5 in which the naphtha feed to the hydrodesulfurization process contains at least about 0.15 wt. percent sulfur.

References Cited in the file of this patent

UNITED STATES PATENTS

| | | |
|---|---|---|
| 2,131,089 | Beeck et al. | Sept. 27, 1938 |
| 2,604,438 | Bannerot | July 22, 1952 |
| 2,642,381 | Dickinson | June 16, 1953 |
| 2,642,383 | Berger et al. | June 16, 1953 |
| 2,642,384 | Cox | June 16, 1953 |
| 2,780,603 | Burton | Feb. 5, 1957 |